United States Patent
Melideo

(10) Patent No.: US 7,496,858 B2
(45) Date of Patent: *Feb. 24, 2009

(54) TELEPHONE CALL INITIATION THROUGH AN ON-LINE SEARCH

(75) Inventor: John Melideo, Westlake Village, CA (US)

(73) Assignee: Jambo Acquisition, LLC, Westlake Village, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 11/771,878

(22) Filed: Jun. 29, 2007

(65) Prior Publication Data

US 2008/0013702 A1 Jan. 17, 2008

Related U.S. Application Data

(63) Continuation of application No. 10/821,467, filed on Apr. 9, 2004, now Pat. No. 7,240,290, and a continuation-in-part of application No. 10/691,982, filed on Oct. 22, 2003, now Pat. No. 7,103,010, and a continuation-in-part of application No. 10/614,394, filed on Jul. 3, 2003, now Pat. No. 7,434,175.

(60) Provisional application No. 60/471,535, filed on May 19, 2003.

(51) Int. Cl.
  G06F 3/00 (2006.01)
  H04L 12/66 (2006.01)
(52) U.S. Cl. .............. 715/835; 715/765; 715/205; 379/93.23

(58) Field of Classification Search .......... 715/700, 715/764, 765, 772, 781, 810, 821, 835, 838, 715/846, 856, 862, 203, 212, 255, 256, 273, 715/275; 705/14, 26; 379/90.01, 93.23; 345/157, 426, 581, 589

See application file for complete search history.

(56) References Cited

U.S. PATENT DOCUMENTS 5,452,289 A 9/1995 Sharma et al.
(Continued)

FOREIGN PATENT DOCUMENTS

WO  WO 00/05679  2/2000

OTHER PUBLICATIONS

Weigand, C.J., Indispensable software on-line, Home Office Computing, Apr. 1, 1992.

(Continued)

*Primary Examiner*—X. L Bautista
(74) *Attorney, Agent, or Firm*—SoCal IP Law Group LLP; Steven C. Sereboff; Mark Andrew Goldstein

(57) ABSTRACT

There are disclosed methods and apparatus for telephone call initiation through an on-line search. A search response includes at least one hit corresponding to a search request, an ad having a dial link, and instructions for triggering a multi-leg phone call with a merchant phone number associated with the dial link and a user phone number. The dial link has a display portion. The search response is displayed, and the dial link is activated. A call trigger is generated in accordance with the instructions in the search response. The call trigger is for initiating a multi-leg phone call with the user phone number and the merchant phone number.

7 Claims, 2 Drawing Sheets

U.S. PATENT DOCUMENTS

| | | | |
|---|---|---|---|
| 5,483,352 | A | 1/1996 | Fukuyama |
| 5,790,638 | A * | 8/1998 | Bertacchi .................. 379/88.26 |
| 5,867,562 | A | 2/1999 | Scherer |
| 6,011,794 | A | 1/2000 | Mordowitz et al. |
| 6,028,917 | A | 2/2000 | Creamer et al. |
| 6,069,890 | A | 5/2000 | White et al. |
| 6,115,461 | A | 9/2000 | Baiyor |
| 6,130,933 | A | 10/2000 | Milislavsky |
| 6,144,667 | A | 11/2000 | Doshi |
| 6,185,194 | B1 | 2/2001 | Musk |
| 6,249,576 | B1 | 6/2001 | Sassin |
| 6,275,490 | B1 | 8/2001 | Mattaway et al. |
| 6,307,853 | B1 | 10/2001 | Storch |
| 6,317,781 | B1 | 11/2001 | De Boor |
| 6,337,858 | B1 | 1/2002 | Petty et al. |
| 6,385,191 | B1 | 5/2002 | Coffman |
| 6,445,468 | B1 | 9/2002 | Tsai |
| 6,470,079 | B1 | 10/2002 | Benson |
| 6,473,423 | B1 | 10/2002 | Tebeka |
| 6,570,964 | B1 | 5/2003 | Murveit |
| 6,600,503 | B2 | 7/2003 | Stautner |
| 6,670,968 | B1 | 12/2003 | Schilit |
| 6,690,672 | B1 | 2/2004 | Klein |
| 6,707,811 | B2 | 3/2004 | Greenberg et al. |
| 6,731,630 | B1 | 5/2004 | Schuster |
| 6,834,048 | B1 * | 12/2004 | Cho et al. .................. 370/356 |
| 6,870,828 | B1 | 3/2005 | Giordano |
| 6,954,524 | B2 | 10/2005 | Gibson |
| 6,973,091 | B1 | 12/2005 | Hester |
| 6,996,221 | B1 | 2/2006 | Baiyor |
| 7,035,384 | B1 | 4/2006 | Scherer |
| 7,058,356 | B2 * | 6/2006 | Slotznick .................. 455/3.05 |
| 7,080,049 | B2 | 7/2006 | Truitt |
| 7,092,496 | B1 | 8/2006 | Maes |
| 7,106,851 | B2 | 9/2006 | Tang |
| 7,110,368 | B2 | 9/2006 | Perry |
| 7,120,235 | B2 | 10/2006 | Altberg |
| 7,170,995 | B2 | 1/2007 | Johnson |
| 7,215,744 | B2 | 5/2007 | Scherer |
| 7,222,304 | B2 | 5/2007 | Beaton |
| 7,295,836 | B2 | 11/2007 | Yach |
| 2001/0038624 | A1 | 11/2001 | Greenberg |
| 2001/0055951 | A1 | 12/2001 | Slotznick |
| 2002/0082892 | A1 | 6/2002 | Raffel |
| 2002/0083093 | A1 | 6/2002 | Goodisman |
| 2002/0089938 | A1 | 7/2002 | Perry |
| 2002/0104090 | A1 | 8/2002 | Stettner |
| 2002/0128036 | A1 | 9/2002 | Yach |
| 2002/0143808 | A1 | 10/2002 | Miller |
| 2003/0014754 | A1 | 1/2003 | Chang |
| 2003/0050045 | A1 | 3/2003 | Kennedy |
| 2003/0050837 | A1 | 3/2003 | Kim |
| 2003/0079024 | A1 | 4/2003 | Hough et al. |
| 2003/0140091 | A1 | 7/2003 | Himmel |
| 2003/0185232 | A1 | 10/2003 | Moore et al. |
| 2003/0228011 | A1 | 12/2003 | Gibson |
| 2004/0032948 | A1 | 2/2004 | Johnson |
| 2004/0078476 | A1 | 4/2004 | Razdow |
| 2004/0122810 | A1 | 6/2004 | Mayer |
| 2004/0141599 | A1 | 7/2004 | Tang |
| 2004/0192263 | A1 | 9/2004 | Tomikawa |
| 2004/0240642 | A1 | 12/2004 | Crandell et al. |
| 2004/0252820 | A1 | 12/2004 | Faber |
| 2005/0074102 | A1 | 4/2005 | Altberg |
| 2005/0114210 | A1 | 5/2005 | Faber |
| 2005/0119957 | A1 | 6/2005 | Faber |
| 2005/0165666 | A1 | 7/2005 | Wong |
| 2005/0289471 | A1 | 12/2005 | Thompson et al. |

OTHER PUBLICATIONS

Schilit, Bill N. et al., m-Links: An Infrastructure for Very Small Internet Devices, Proceedings of the 7th Annual Int'l Conference on Mobile Computing and Networking, Rome, Italy, Jul. 2001, ACM Press, p. 122-131.

Rosenberg et al., SIP Event Packages for Call Leg and Conference State, http://www.jdrosen.net/sip_callpkg.html, Mar. 1, 2002.

Porter, Brad, Call Control Requirements in a Voice Browser Framework, http://www.w3.org/TR/call-control-reqs/, Apr. 13, 2001.

* cited by examiner

TELEPHONE CALL INITIATION THROUGH AN ON-LINE SEARCH

RELATED APPLICATION INFORMATION

This patent is a continuation-in part of Application No. 60/471,535 filed May 19, 2003 entitled "HyperDial," which is incorporated herein by reference.

This patent is a continuation-in-part of application Ser. No. 10/614,394 filed Jul. 3, 2003 entitled "Displaying Telephone Numbers as Active Objects," which is incorporated herein by reference.

This patent is a continuation-in-part of application Ser. No. 10/691,982 filed Oct. 22, 2003 entitled "Application Independent Telephone Call Initiation," which is incorporated herein by reference.

This patent is a continuation of application Ser. No. 10/821,467 filed Apr. 9, 2004 entitled "Telephone Call Initiation Through An Online Search," which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND

1. Field of the Invention

The present invention relates to initiation of telephone calls.

2. Description of Related Art

Efforts have been made in integrating the Web with telephony applications. One such popular application is the placing of telephone calls from PC to a regular telephone. A user can place a call to a regular telephone from the Web using Dialpad (Dialpad Communications, Inc.) or Net2Phone (Net2Phone, Inc.). In these applications, a user must manually enter a telephone number each time he wishes to initiate a call, or pick a telephone number from a structured list stored by and only available from the dialing application. In view of the success of such products and services, one could conclude that the users were satisfied and there has been no motivation to seek other solutions.

Some companies, in conjunction with their sales and customer-support efforts, have added a "call me" or "call-back" function to their web sites. With these functions, a user who browses to the company's web site may then manually enter his own telephone number and other information into a web page. The company's computers then initiate the call back to the user. This configuration is considered a "single-leg" phone call, because the call is initiated from one phone number to another phone number.

In contrast to single-leg phone calls, it is known to create multi-leg phone calls. One common form of multi-leg phone call is the operator assisted conference call. Multi-leg phone calls are also initiated in international call-back, in which a customer makes an incomplete call to a switch, and the switch then calls the customer back and connects the customer to a second phone number. As demonstrated by these two examples, multi-leg phone calls have been used primarily for complex calling arrangements having three or more parties, or where it is desirable to arbitrage calling costs or other factors between two parties.

DETAILED DESCRIPTION

Throughout this description, the embodiments and examples shown should be considered as exemplars, rather than limitations on the apparatus and methods disclosed.

Description of Systems

Figure 1:
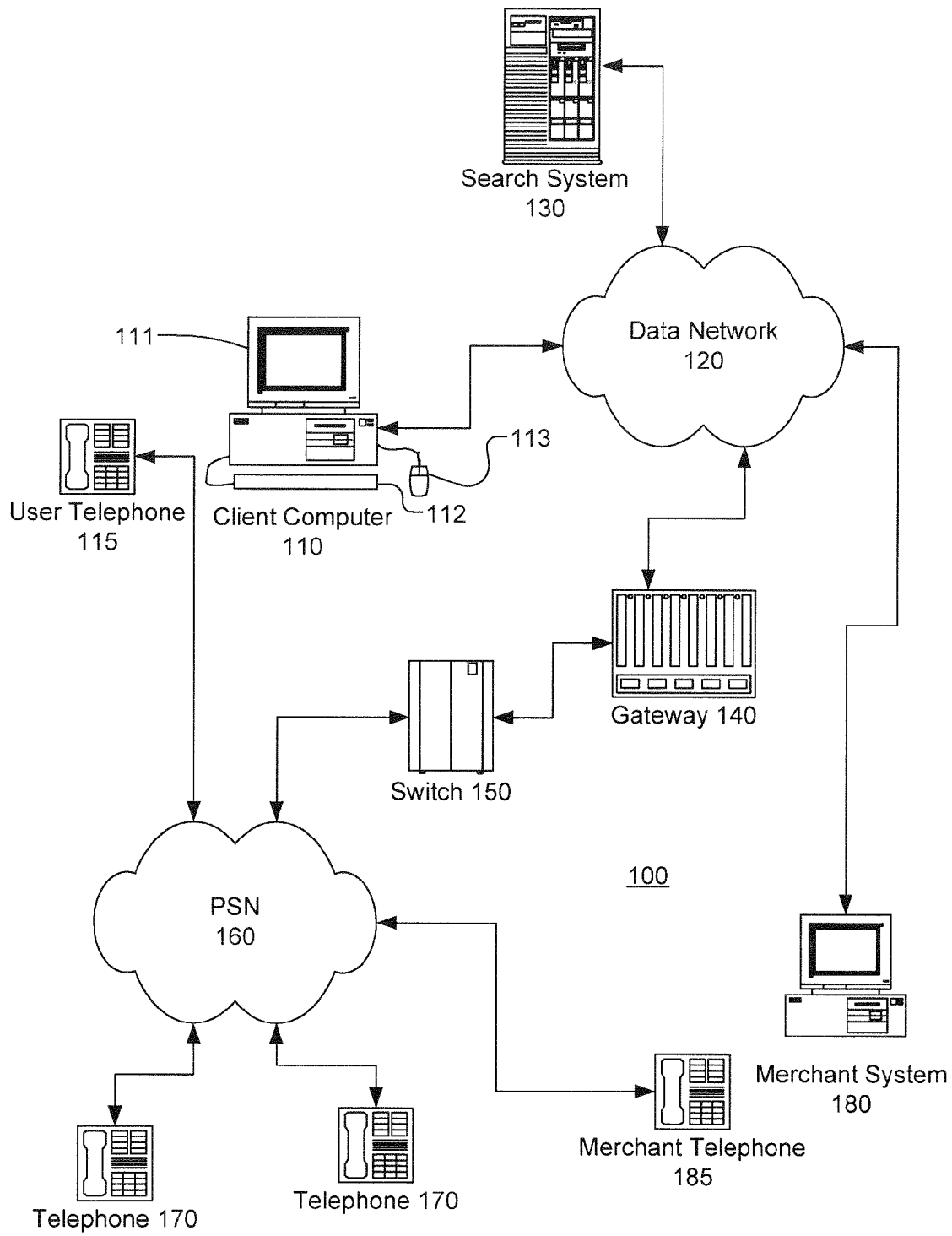
FIG. 1 is a block diagram of an environment.

Referring now to FIG. 1, there is shown a block diagram of an environment 100 for telephone call initiation through an on-line search. The environment 100 includes a client computer 110, a user telephone 115, a data network 120, a search system 130, a gateway 140, a switch 150, a public switched network (PSN) 160, plural telephones 170, a merchant system 180 and a merchant telephone 185.

The client computer 110 may comprise a general purpose computer. The client computer 110 may be, for example, a PC running a Microsoft Windows operating system. The client computer 110 may include an output device, such as a display 111, and an input device, such as a keyboard 112 and/or a pointing device 113 (e.g., mouse, track ball, light pen, or data glove). The client computer 110 may be a computing device such as a workstation, server, portable computer, personal digital assistant (PDA), computing tablet, two-way messaging devices (e.g., Blackberry™), smart display terminal, and the like. The client computer 110 connects with and communicates on the data network 120 and includes an interface therefore. The client computer 110 may comprise an assembly of devices, such as a television and a set-top box which interfaces to the data network 120.

The client computer 110, the search system 130, the gateway 140, the switch 150 and the merchant system 180 may include software and/or hardware for providing the functionality and features described herein and claimed. The client computer I 0, the search system 130, the gateway 140, the switch 150 and the merchant system 180 may therefore include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The hardware and firmware components of the client computer 110, the search system 130 and the merchant system 180 may include various specialized units, circuits, software and interfaces for providing the functionality and features claimed. The invention may be embodied in whole or in part in software which operates on the client computer 110, the search system 130, the gateway 140, the switch 150 and/or the merchant system 180, and may be in the form of application programs, applets (e.g., a Java applet), browser plug-ins, COM objects, dynamic linked libraries (DLL), script (e.g., JavaScript, Visual Basic), subroutines, operating system components or services, or terminate and stay resident programs (TSR). The hardware and software of the invention and its functions may be distributed such that some components are performed by the client computer 110, the search system 130, the merchant system 180, the gateway 140, the switch 150 and others by other devices.

The data network 120 provides lower layer network support for data communications between the client computer 110, the search system 130, the gateway 140 and the merchant system 180. The data network 120 may be packet-switched and may comprise a common or private bi-directional data network, and may be, for example the Internet or utilize the IP protocol.

The search system 130 may be a web server having the ability to respond to search requests from client computers such as the client computer 110. The search system 130 may be or include a search engine (e.g., Google), and may be a search aggregator (e.g., DogPile). The search system 130 may consolidate proprietary search content, other content and aggregated search and other content (e.g., Yahoo), and may provide some or all of its content to others (e.g., InfoSeek, Overture). The search system 130 may be or include a number of separate devices, including servers. The search system 130 may include an interface which allows merchants and others to reserve or purchase ads, such as paid-placement search listings, paid-placement ads and banner ads. The search system 130 may obtain ads through third parties, such as through aggregation and/or sub-contracting.

The PSN 160 is a common carrier network which provides circuit switching and/or IP telephony between public users. The PSN 160 may be the public switched telephone network (PSTN). The PSN 160 may operate according to standards such as SS6, SS7 and SIP.

The telephones 115, 170, 185 may be ordinary analog telephones connected to the PSN. The telephones 115, 170, 185 may be digital devices (e.g., SIP devices or telephone sets connected through a PBX) for providing voice communications. The telephones 115, 170, 185 may also be wireless voice communications devices such as cell phones. The user telephone 115 may be located proximate the client computer 110, or in a location under common control of the user of the client computer 110. The merchant telephone 185 may be located proximate the merchant system 185, or in a location under common control of the merchant. The telephones 115, 170, 185 have respective phone numbers. The phone numbers may conform to the standard United States format, (NPA) NPX nnnn, or make take other forms.

The switch 150 may be a voice switch, circuit switch and/or an IP switch and may be compliant with standards such as SS6, SS7 or SIP. The switch 150 is compatible with the PSN 160, and has the ability to set up and tear down telephone connections in the PSN 160.

The gateway 140 interfaces between the packet-switched data network 120 and the switch 150. The gateway 140 may be a signaling gateway platform (SGP), which is an intelligent service exchange node that integrates services between circuit-switched and packet-switched networks. The gateway 140 may be integrated into the PSN 160 or the switch 150.

The merchant system 180 may be a general purpose computer similar to the client computer 110, or may be a computer system including, for example a web server for the merchant's web site. The merchant system 180 may be used by the merchant to interact with other systems through the data network 120. For example, the merchant system 180 may be used to arrange for paid-placement search listings and paid-placement ads through the search system 130.

Description of Methods

Figure 2:
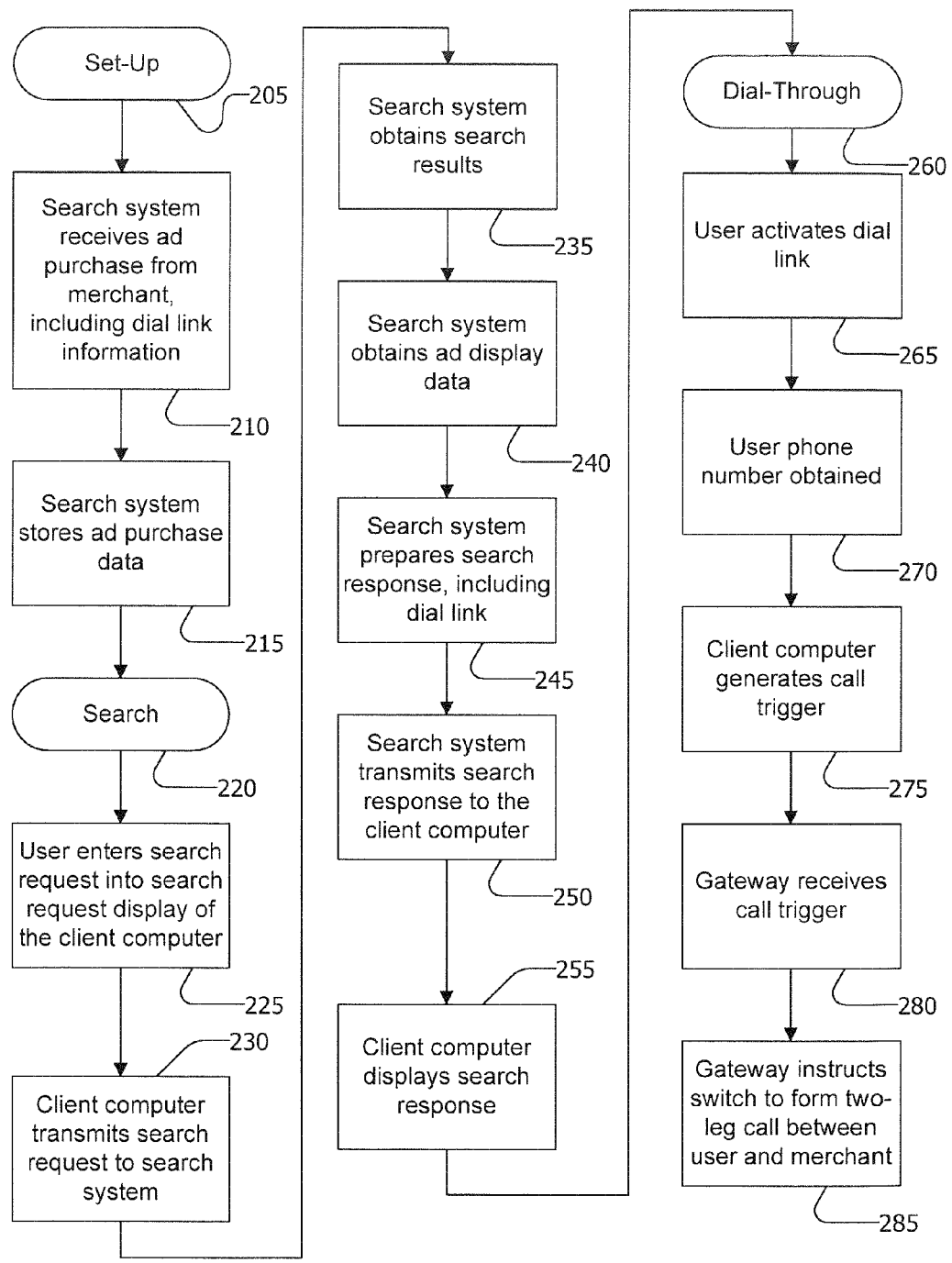
FIG. 2 is a flow chart of a method of telephone call initiation.

Referring now to FIG. 2, there is shown a flow chart of a method of telephone call initiation through an on-line search. The method may include one or more of the following phases: a set-up phase, a search phase, a dial-through phase and a billing phase. Although these phases are described as separate, they may overlap in time. Furthermore, there may be many merchants, many users and many search systems performing various steps of the phases, and their performance may be varied in time and order. The following description is simplified to one user, one merchant and one search system.

Set-Up Phase 205

In the set-up phase 205, the merchant arranges for ads to be placed with the search system 130. Thus, one step is for the search system 130 to receive ad purchase data from the merchant (step 210). The merchant may make an ad purchase using the merchant system 180 connecting to the search system 130. Through the ad purchase, the merchant defines or provides the ad purchase data. The ad purchase data may include display conditions for the ad, ad content, information for retrieving ad content (e.g., a URL for a banner ad), a merchant on-line address and the merchant phone number. The display conditions may include key words, strings, concepts, URLs, portions of URLs, and other things which a merchant might want to use to trigger display of the ad. The merchant on-line address may be a URL for the merchant's web site. The ad purchase data may also include dates for starting and stopping displays of the ad, a fixed or variable price (e.g., bid price) for the ad, ad copy, and one or more URLs for retrieving the ads and ad components.

The search system 130 may store the ad purchase data in a database (step 215). A merchant identifier may be associated with the ad purchase data. The merchant identifier may be a data key for uniquely identifying the merchant, and may include or be the merchant phone number.

The set-up phase 205 may be performed many times by the merchant, its steps may be integrated, and may allow the merchant to make multiple ad purchases in a single session. Furthermore, the search system 130 may allow the merchant to modify the ad purchase data, for example to improve performance of the merchant's ads.

Search Phase 220

In the search phase 220, the user obtains search results from the search system 130.

In one embodiment, the search is browser-based. Thus, the user activates a browser on the client computer 110, points the browser to the search system 130, and the browser receives a search request page from the server system 130. The user enters a search request into the search request page (step 225), and the browser/client computer 110 transmits the search request to the search system 130 (step 230).

In other embodiments, the search is not browser-based. For example, the search request may come from a user through other means, or from an automated system. Thus, a person or system requesting a search will be referred to herein as a search requester. Also, displayable matter from the search system 130 and displayed by the client computer 110 can take forms other than pages.

The search system 130 then obtains a search result in response to the search request (step 235). The search result may be obtained by searching a key word database, from other types of databases, through aggregation, or through algorithmic retrieval of distributed data and information.

The search result may include one or more hits. As used herein a "hit" is a successful retrieval of a record matching the search request. A record may be a database record or a discrete collection of related but different data. The search system 130 then prepares a search response including one or more of the hits and the ad display data (step 245). The search response may be a web page.

At some point, the display conditions for the merchant's ad are triggered, for example based upon key words in the search request (step 240). In that case, the search response also includes display data for the ad. The ad display data may include instructions for retrieving or may directly include all or a subset of the ad purchase data, such as the URL for the ad, ad content, links for the ad, and accounting instructions and information. The ad display data may include a dial link, or instructions for retrieving a dial link for the ad. The dial link has a code from which the merchant phone number may be obtained (e.g., all or a portion of the merchant phone number, or the merchant identifier), and instructions for triggering calls to the merchant phone number and a user phone number. The dial link may include a display portion.

The search system then transmits the search response to the search requester (step 250).

The search requester receives and displays the search response (step 255). The display of the search response may be presented as an ordered list, with the ad placed in various positions with respect to the list. Depending on the type and format of the ad, for example, the ad may appear within the list, at the top of the list, above the list, to the side of the list, in a pop-up window, in a banner, or in separate dedicated window. The display of the ad may include the display portion of the dial link, to indicate to the user the availability of a telephone connection to the merchant. The display portion may be integrated with the ad display, and may be distinct from the ad display. The display portion of the dial link may be the merchant telephone number, or may be a notice to the user (e.g., "click here to call the merchant"), or may be otherwise.

Dial-Through Phase 260

In the dial-through phase 260, the user responds to the ad by having the merchant call him. Initially, this involves the user activating the dial link (step 265). The user may activate the dial link by using the pointing device 113 to click on the display portion of the dial link.

When the dial link is activated, instructions in the dial link may obtain a phone number which the user wishes to have the merchant call—"a user phone number" (step 270). The instructions may be a CGI string or utilize an exposed API. The dial link may include or refer to JavaScript or other program code for obtaining the user phone number.

According to the instructions in the dial link, the client computer 110 may ask the user to enter a phone number. A pop-up window or dialog may be displayed for the user to enter the user phone number. If the user has previously entered a phone number, this previously entered phone number may be used automatically. Alternatively, the user may be asked to select from one or more previously entered phone numbers, and/or given an option to enter a new phone number. The client computer 110 may suggest a phone number to the user or automatically select a phone number, for example through a database lookup. For example, through SIP, the user phone number (i.e., IP address) may be obtained automatically. The user phone number(s) may be stored on the client computer 110 (for example, in a cookie) or remotely. There may be a user identifier stored locally or remotely and used for a database lookup. The user may select any telephone number he wishes, such as the telephone 175, a remote telephone or otherwise.

The client computer 110 then generates a call trigger in accordance with the instructions in the dial link (step 275). The call trigger may be an IP-based message. The call trigger includes sufficient information so that a multi-leg call to the merchant phone number and the user phone number may be initiated. This information may be the merchant phone number and the user phone number. Alternatively, database keys such as the merchant identifier and a user identifier may be used for retrieving one or both of the merchant phone number and the user phone number.

The call trigger is transmitted directly or indirectly to the gateway 140 (step 280), which then instructs the switch 150 to form a multi-leg call to the merchant phone number and the user phone number (step 285). Thus, the user receives a phone call at the user phone number, and the phone call is connected to the merchant phone number. The gateway 140 and/or the switch 150 may have call handling intelligence (e.g., IVR, ACD, CTI) so that, for example, the call to the merchant phone number is set up before the call to the user phone number.

In an embodiment where the call trigger is sent indirectly to the gateway 140, a dedicated TCP connection may be opened to authenticate the call trigger. The TCP connection may be kept open during the entire period of the call before it is disconnected. Asynchronous call status messages may be processed as they arrive.

Call status information from the switch 150 may be transmitted to the client computer 110, the search system 130, the merchant system 180 and/or others. The call status information may be, for example, "connected," "dropped," "busy" and "closed." The switch 150 may send the call status information directly or indirectly.

When the user activates the dial link (step 265), other activity may be triggered as well. For example, using a URL in the ad data, a page on the merchant's web site may be opened. It may be especially beneficial for the user to browse the merchant's web site in conjunction with the multi-leg phone call, so that a merchant representative may speak with the user concurrently with the user's interaction with the merchant's web site. For example, the merchant representative may make suggestions and/or provide help and explanations, thus encouraging the user to purchase additional products or engage in other additional business with the merchant.

In addition to the user and the merchant, others may be included originally or later added to the multi-leg phone call. The user, the merchant or another party or system may initiate adding additional legs and/or removing existing legs.

The multi-leg phone call may include one or more audio messages. The audio messages may be or include human speech, music, tones and trademark sounds. The audio messages may be played at the beginning of the multi-leg phone call, during intermissions, and at the end. The audio messages may be advertisements, for example to offset or cover the cost of or generate profits from the multi-leg phone call. The audio messages may be selected based upon many different criteria. For example, the audio messages may be selected or provided by the merchant. The audio messages may be selected at various granularities, e.g., from national to local, from everyone to individuals of selected demographics. Information for selecting audio messages, such as keys to database records, may be included in the dial link and/or the call trigger. The audio messages may be selected by other parties involved in the set-up phase 205, the search phase 220, the dial-through phase 260 and/or the billing phase.

Billing Phase

In the billing phase, the merchant is billed for the user's activation of the dial link. Billing may be accomplished in many different ways. The dial link may include an instruction for sending a message to a billing system to charge the merchant for activation of the dial link. The dial link may include the merchant identifier for use in billing. The merchant may be billed by the search system 130 when the merchant's ad is served to the user, i.e., for including the dial link in the search response. The gateway 140 may initiate billing to the merchant. The merchant may be charged on a fixed fee basis or on a variable basis. The variables may include call length, time of day, day of week, location of the user phone number, location of the merchant phone number, and otherwise.

Alternatively, the user or a third party may be billed for the activation of the dial link and/or for connecting the merchant and the user in a phone call.

Because the merchant ad may be solicited indirectly and through multiple layers of different parties, source identifiers may be used in the dial link and/or obtained when the dial link is activated so that an entity which solicited the ad may receive credit (e.g., payment).

Captured metrics deliver a rate of activity associated with an Internet advertisement. These metrics can dictate for example, the success of an advertisement or advertising campaign. These metrics can deliver a rate of activity associated with an advertisement. Metrics related to call activity generated from a given dial link or links may be obtained. For example, a dial-through rate may be calculated as the revenues divided by the number of multi-leg phone calls. The revenues may be based upon many factors, such as flat pricing per call, secondary revenue and bid pricing.

At various times, calling information associated with a dial link may be accumulated. In response to a request for a report, a report may be formulated based on the accumulated calling information for the dial link. The report may be formatted for electronic transmission. The formatted report may be electronically transmitted to an entity associated with the advertising campaign.

Server-Side Embedding of Dial Links

In addition to the search responses described above, dial links may be included in active displays. For example, a merchant web site on the merchant system 180 may include dial links. The dial links may be manually embedded, or may be automatically identified and created as described in the previously mentioned application Ser. No. 10/614,394 ("Displaying Telephone Numbers as Active Objects"). Although application Ser. No. 10/614,394 generally describes client-side operations, the functionality of identifying phone numbers and rendering the activatable may be performed on the server-side. In such a case, the server would embed dial links as described herein for initiation of multi-leg phone calls, and would obtain the user phone number as described therein or herein.

The search system 130 and/or the merchant system 180 may be configured and operate in accordance with aspects of the systems and method described in the previously mentioned application Ser. No. 10/691,982 ("Application Independent Telephone Call Initiation"). For example, the methods described in paragraphs 57-66 may be used by the merchant server 180 in the merchant web site, with the user phone number being obtained as described therein or herein. Furthermore, the client computer 110 and other systems may operate in accordance with the some or all of the description in paragraphs 24-35 and 42-56.

Although exemplary embodiments have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the claims.

It is claimed:

1. A system for telephone call initiation through an on-line search, the system having software which when executed causes the system to perform actions comprising:
    receiving ad purchase data from a merchant over a network, the ad purchase data including an ad display condition, ad content information, and merchant information;
    receiving a search request from a search requester over the network;
    obtaining a search result over the network in response to the search request;
    preparing a search response including
        one or more displayable hits,
        a displayable ad based upon the ad content information, the displayable ad having a dial link, the dial link having a display portion for indicating availability of initiation of a phone call with the merchant associated with the dial link
        instructions for triggering a multi-leg phone call between the merchant and the search requester
    transmitting the search response over the network to the search requester.

2. The system of claim 1 wherein
    the search requester comprises a user at a client computer
    the multi-leg phone call is between a merchant telephone and a user telephone distinct from the client computer.

3. The system of claim 1 wherein
    the search requester comprises a user at a computing device
    the multi-leg phone call is between a merchant telephone and a user telephone distinct from the computing device.

4. The system of claim 1 wherein the triggering instructions are included in the dial link.

5. The system of claim 1 wherein the search response is a web page.

6. The system of claim 1 wherein the dial link includes a merchant identifier.

7. The system of claim 6 the merchant identifier comprises the merchant phone number.

* * * * *

Disclaimer 7,496,858 B2 — John Melideo, Westlake Village, CA (US). TELEPHONE CALL INITIATION THROUGH AN ON-LINE SEARCH. Patent dated February 24, 2009. Disclaimer filed May 10, 2011, by the assignee, Jambo Acquisition, LLC.

Hereby enters this disclaimer to claims 1-7 of said patent.

(*Official Gazette June 14, 2011*)